UNITED STATES PATENT OFFICE.

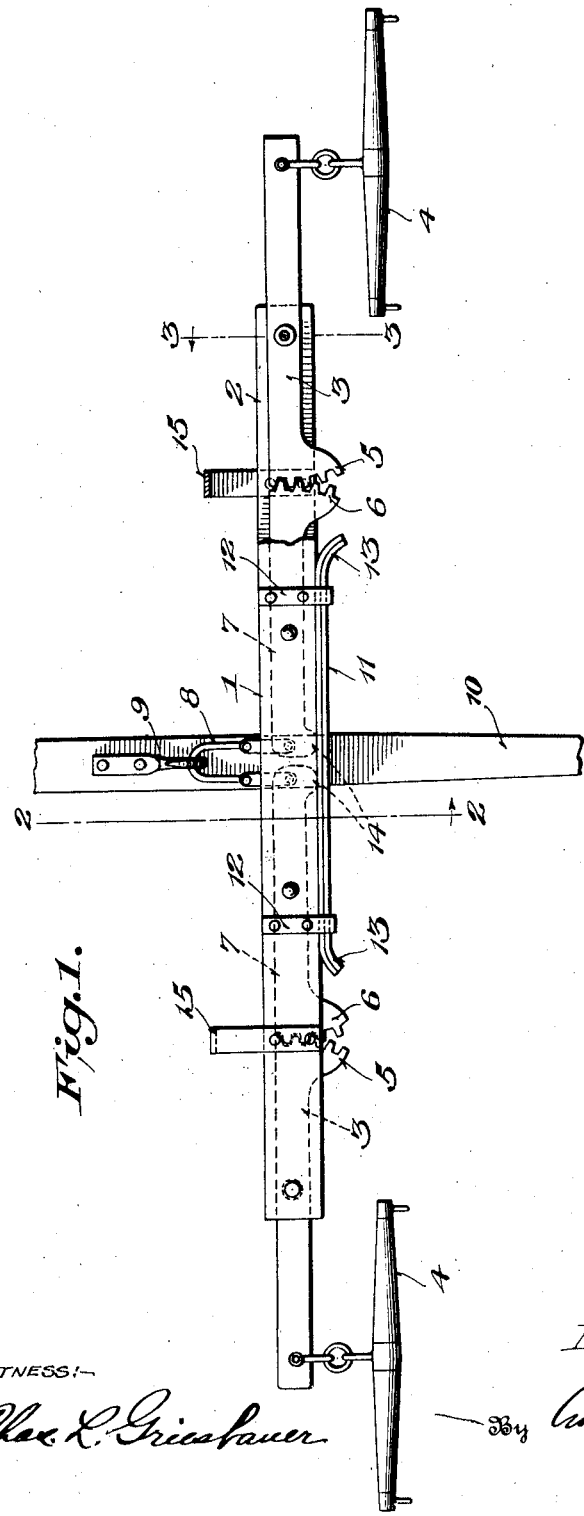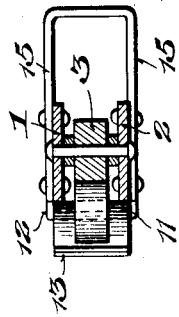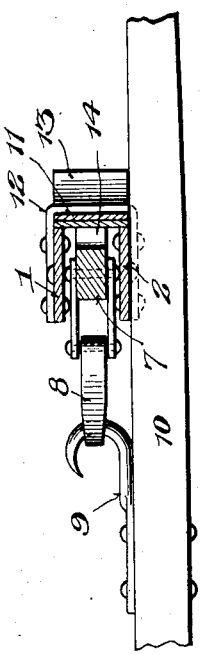

MARTIN F. WILLIAMS, OF BROOKLYN, NEW YORK.

DOUBLETREE.

1,388,228.

Specification of Letters Patent.  Patented Aug. 23, 1921.

Application filed August 6, 1920. Serial No. 401,611.

*To all whom it may concern:*

Be it known that I, MARTIN F. WILLIAMS, a citizen of the United States, residing at Brooklyn, in the county of Kings and State of New York, have invented new and useful Improvements in Doubletrees, of which the following is a specification.

The present invention relates to improvements in double trees and has for its object to provide a strong and durable device which can be readily applied to a vehicle tongue and by which the draft or pull exerted on the swingle trees will be uniformly resisted.

In the accompanying drawings:—

Figure 1 is a plan of a double tree constructed in accordance with the present invention;

Fig. 2 is a sectional view on the line 2—2 of Fig. 1;

Fig. 3 is a sectional view on the line 3—3 of Fig. 1.

Referring to the drawings the improved double tree comprises a body portion including two parallel bars 1, 2. Between said frame bars are pivotally mounted two swingle tree levers 3, the outer ends of which project beyond the ends of the frame bars 1, 2, and are connected with the swingle trees 4.

The inner end of each swingle tree lever is preferably increased slightly in width and formed with a plurality of teeth 5 constituting a segmental rack extending concentric with the pivotal axis of said lever. The racks 5 engage corresponding teeth 6, formed at the outer ends of intermediate levers 7 which are pivotally connected between the main frame bars 1, 2, and to the inner ends of said intermediate levers is attached a link or band 8 that is adapted to be engaged with a draft hook 9 on the upper face of the vehicle tongue 10.

A flat leaf spring 11 is positioned along the front edges of the frame bars 1, 2, the ends thereof extending through loops 12 secured to the top and bottom faces of the frame bars and being curved slightly forward as shown at 13. At its inner end each intermediate lever 7 is provided with a forwardly extending toe or lug 14 which bears against the spring 11.

It will be seen that the draft exerted through either swingle tree will tend to cause a rocking of the adjacent intermediate lever 7 which will be resisted by the spring 11 and transmitted through the link 8 and hook 9 to the vehicle tongue.

Rearward movement of the inner ends of the swingle tree levers 3 is limited by guide loops or straps 15 attached to the main frame bars 1, 2, and the spring 11 acts to normally maintain the swingle tree and intermediate levers 3, 7, in alinement with each other and parallel to the main frame bars.

It will be seen that the entire device can be readily removed from the vehicle tongue and when in position thereon the draft link 8 directly engages the hook 9.

One of the particular advantages of the invention is that it provides a means which can be readily applied to an ordinary vehicle tongue. Heretofore various means for evening the draft on swingle trees or producing a uniform resistance to pull exerted thereon have been proposed in which the main members embraced the vehicle tongue or required the use of a tongue of special construction. The double tree of the present invention, however, it will be noted, simply rests on an ordinary vehicle tongue and can be readily applied to or removed as desired.

Having thus described the invention what is claimed is:

1. A double tree comprising a frame, two swingle tree levers pivotally mounted on said frame and each projecting beyond the adjacent end thereof, the inner end of each lever being provided with a plurality of teeth extending concentric with the lever pivot, a pair of intermediate levers pivotally mounted on the frame and each having its outer end provided with teeth engaging the teeth on the inner end of the adjacent swingle tree lever, spring means coöperating with the intermediate levers to normally maintain them and the swingle tree levers in alinement, and means connected to the intermediate levers near their inner ends and adapted to be engaged with an abutment on a vehicle tongue.

2. A double tree comprising a frame, two swingle tree levers pivotally mounted on said frame and each projecting beyond the adjacent end thereof, the inner end of each lever being provided with a plurality of teeth extending concentric with the lever pivot, a pair of intermediate levers pivotally mounted on the frame and each having its outer end provided with teeth engaging the teeth on the inner end of the adjacent swingle tree lever and its other end provided with a forwardly extending projection, a leaf spring extending longitudinally of the main frame and against which said projections on the intermediate levers bear, and a link pivotally connected with and extending rearward from the inner ends of the intermediate levers and adapted to be engaged over a hook on a vehicle tongue.

3. A double tree comprising two parallel frame bars, two swingle tree levers pivotally mounted between said frame bars and each projecting beyond the ends thereof, the inner end of each lever being provided with a plurality of teeth, a pair of intermediate levers pivotally mounted between the frame bars and each having its outer end provided with teeth engaging the teeth on the inner end of the adjacent swingle tree lever, a leaf spring extending along the front edges of the frame bars, guides attached to the frame bars and extending across said spring, projections at the inner ends of the intermediate levers bearing against the spring, and means for connecting the inner ends of said intermediate levers with a hook on a vehicle tongue.

In testimony whereof I have hereunto set my hand.

MARTIN F. WILLIAMS.